(12) United States Patent
Chen et al.

(10) Patent No.: US 8,169,248 B2
(45) Date of Patent: May 1, 2012

(54) SIGNAL PROCESSING CIRCUIT AND SIGNAL PROCESSING METHOD

(75) Inventors: Hsin-Hung Chen, Miaoli County (TW); Chun-Pang Wu, Kaohsiung (TW); Ping-Ying Wang, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/052,099

(22) Filed: Mar. 20, 2011

(65) Prior Publication Data

US 2011/0163790 A1 Jul. 7, 2011

Related U.S. Application Data

(63) Continuation of application No. 12/511,971, filed on Jul. 29, 2009, now Pat. No. 7,932,763.

(60) Provisional application No. 61/166,236, filed on Apr. 2, 2009.

(51) Int. Cl.
*H03H 11/16* (2006.01)

(52) U.S. Cl. .................... 327/233; 327/234; 375/269
(58) Field of Classification Search .......... 327/231–236; 375/268, 269; 455/118, 119
See application file for complete search history.

(56) References Cited

U.S. PATENT DOCUMENTS

| 7,068,984 | B2 | 6/2006 | Mathe |
| 7,212,791 | B2 | 5/2007 | Arayashiki |
| 7,230,996 | B2 * | 6/2007 | Matsuura et al. ............. 375/296 |
| 2007/0223625 | A1 * | 9/2007 | Rofougaran ................. 375/302 |

* cited by examiner

*Primary Examiner* — An Luu
(74) *Attorney, Agent, or Firm* — Winston Hsu; Scott Margo

(57) ABSTRACT

A signal processing circuit includes: a phase modulating path arranged to adjust a phase component of an input signal to generate an adjusted phase component such that a phase difference of the input signal falls within a target phase difference range; and an amplitude modulating path arranged to exchange a sign of an amplitude component of the input signal corresponding to the phase component to generate an adjusted amplitude component when the phase modulating path adjusts the phase component.

17 Claims, 9 Drawing Sheets

| Phase difference range | Compensative phase ($\theta$) | Weight factor (Wt) |
|---|---|---|
| R1 | $-\pi$ | -1 |
| R2 | $\pi$ | -1 |
| R3 | 0 | 1 |

| Phase difference range | Compensative phase ($\theta'$) | First weight factor (Wt1) | Second weight factor (Wt2) |
|---|---|---|---|
| R1' | $-\pi/4$ | $\sqrt{2}/2$ | $\sqrt{2}/2$ |
| R2' | $-\pi/2$ | 0 | 1 |
| R3' | $-3\pi/4$ | $-\sqrt{2}/2$ | $\sqrt{2}/2$ |
| R4' | $-0$ | $-1$ | 0 |
| R5' | $-5\pi/4$ | $-\sqrt{2}/2$ | $-\sqrt{2}/2$ |
| R6' | $-3\pi/2$ | 0 | $-1$ |
| R7' | $-7\pi/4$ | $\sqrt{2}/2$ | $-\sqrt{2}/2$ |
| R8' | 0 | 1 | 0 |

SIGNAL PROCESSING CIRCUIT AND SIGNAL PROCESSING METHOD

CROSS REFERENCE TO RELATED APPLICATIONS

This continuation application claims the benefit of co-pending U.S. application Ser. No. 12/511,971 (filed on 2009 Jul. 29), which claims the benefit of U.S. Provisional Application No. 61/166,236 (filed on 2009 Apr. 2). The whole content of the related applications is incorporated herein by reference.

BACKGROUND

The present invention is related to a signal processing circuit and method thereof, and more particularly, to a signal processing circuit for limiting a phase variation of an input signal to a specific range and a method thereof.

FIG. 1 is a diagram illustrating a conventional polar transmitter 10. The conventional polar transmitter 10 comprises a polar signal generating circuit 11, a modulating circuit 12, a phase-locked loop circuit 13, and a multiplier 14. The polar signal generating circuit 11 generates an amplitude component SA and a phase component SP according to a baseband input signal SI. The modulating circuit 12 performs a differentiation upon the phase component SP to generate a corresponding frequency component SF. The phase-locked loop circuit 13 locks the frequency component SF according to a carrier signal of the phase-locked loop circuit 13, and generates an up-converted signal SUP to the multiplier 14. The multiplier 14 multiplies the up-converted signal SUP with the amplitude component SA to generate a transmitted signal ST. Conventionally, to improve the adjacent channel leakage rejection of the polar transmitter 10, a higher oversampling ratio (OSR) is preferred. However, the higher oversampling ratio causes a higher frequency to be output from the modulating circuit 12 since the modulating circuit 12 performs the differentiation upon the phase component SP. Furthermore, when a drastic phase variation occurs in the phase component SP of the baseband input signal SI, e.g., 180° of phase variation occurs in the phase component SP, a peak frequency will also be generated at the output of the modulation circuit 12. It should be noted that the higher frequency is outputted from the modulating circuit 12, and a more complicated phase-locked loop circuit 13 is required to lock the frequency component SF. Therefore, how to reduce the frequency outputted from the modulating circuit 12 is a significant concern in the field of polar transmitters.

SUMMARY

According to a first embodiment of the present invention, a signal processing circuit is provided. The signal processing circuit comprises a phase modulating path and an amplitude modulating path. The phase modulating path is arranged to adjust a phase component of an input signal to generate an adjusted phase component such that a phase difference of the input signal falls within a target phase difference range. The amplitude modulating path is arranged to exchange a sign of an amplitude component of the input signal corresponding to the phase component to generate an adjusted amplitude component when the phase modulating path adjusts the phase component.

According to a second embodiment of the present invention, a signal processing circuit is provided. The signal processing circuit comprises a phase modulating path and an amplitude modulating path. The phase modulating path is arranged to adjust a phase component of an input signal to generate an adjusted phase component such that a phase difference of the input signal falls within a target phase difference range. The amplitude modulating path is arranged to adjust an amplitude component of the input signal corresponding to the phase component to generate an adjusted amplitude component according to at least one weighting factor when the phase modulating path adjusts the phase component.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
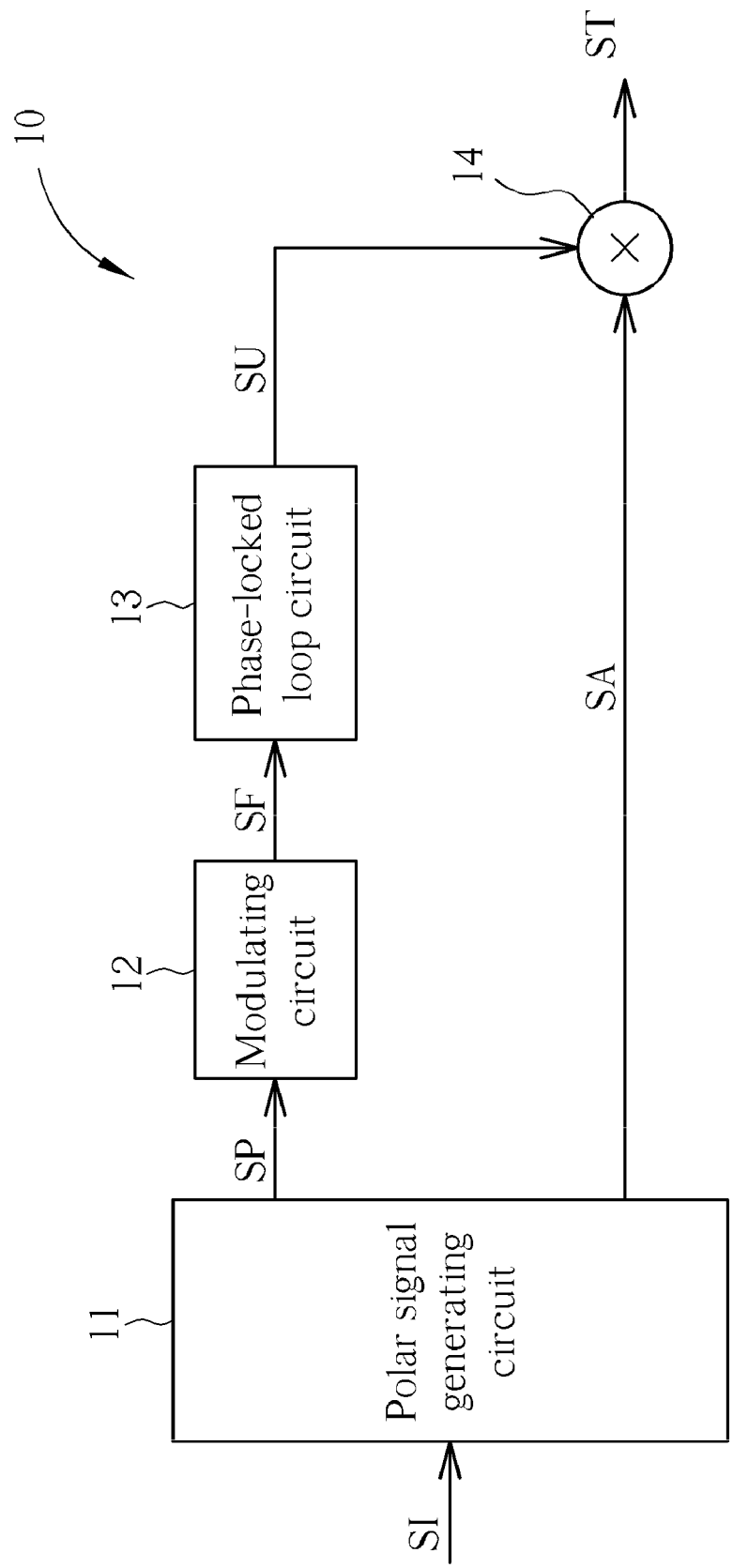
FIG. 1 is a diagram illustrating a conventional polar transmitter.
Figure 2:
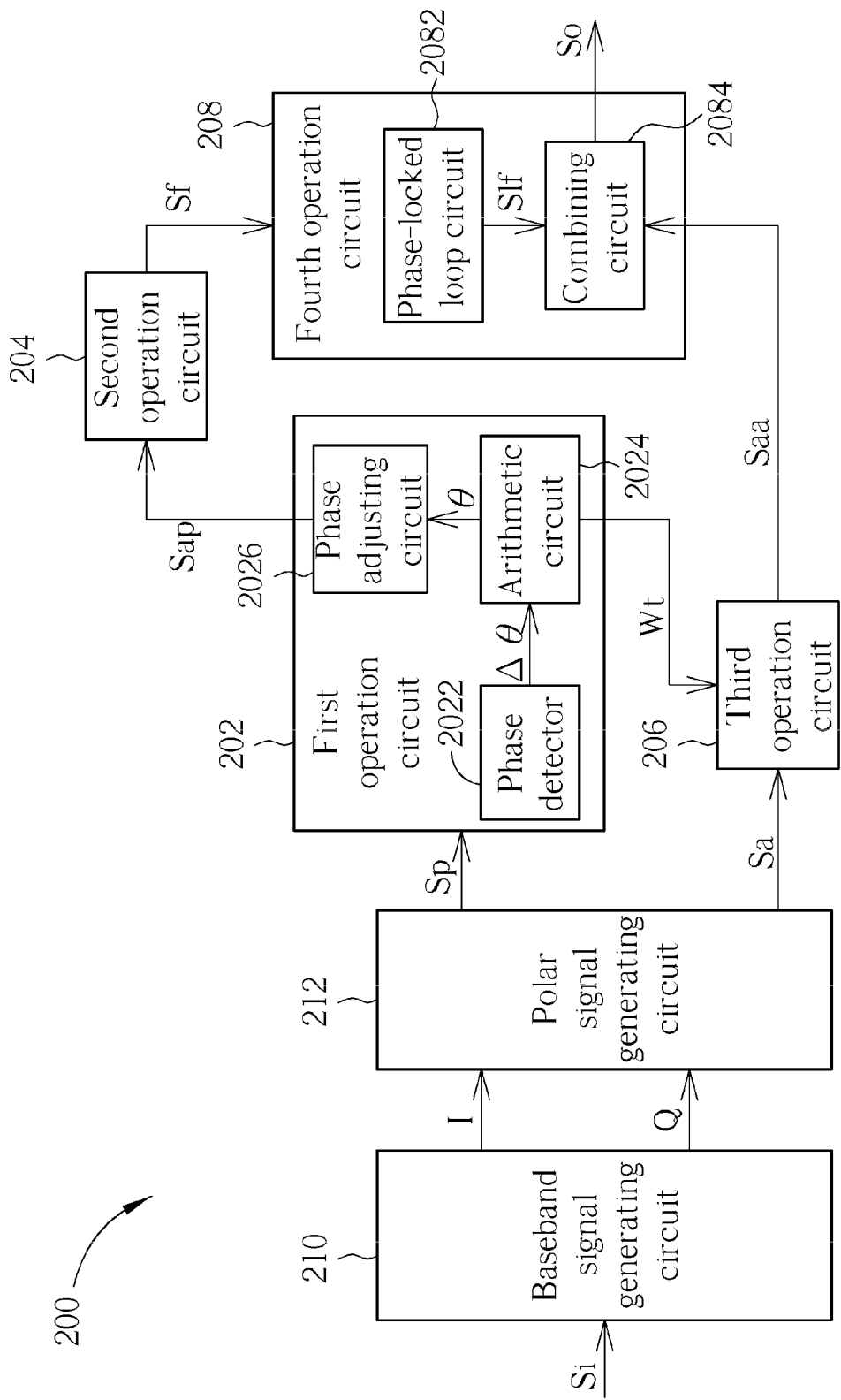
FIG. 2 is a diagram illustrating a signal processing circuit according to a first embodiment of the present invention.

FIG. 2 is a diagram illustrating a signal processing circuit 200 according to a first embodiment of the present invention. The signal processing circuit 200 comprises a first operation circuit 202, a second operation circuit 204, a third operation circuit 206, and a fourth operation circuit 208. It should be noted that the signal processing circuit 200 is disposed in a transmitter, such as a polar transmitter, but this is not meant to be a limitation of the present invention. The first operation circuit 202 receives a phase component Sp of an input signal Si and generates an adjusted phase component Sap and at least one weighting factor Wt according to the phase component Sp of the input signal Si. The second operation circuit 204 is coupled to the first operation circuit 202 for receiving the adjusted phase component Sap and converting the adjusted phase component Sap into a frequency component Sf corresponding to the adjusted phase component Sap. The third operation circuit 206 is coupled to the first operation circuit 202 for receiving an amplitude component Sa of the input signal Si, and adjusting the amplitude component Sa according to the weighting factor Wt to generate an adjusted amplitude component Saa. The fourth operation circuit 208 is coupled to the second operation circuit 204 and the third operation circuit 206 for generating an output signal So according to the frequency component Sf and the adjusted amplitude component Saa. Please note that, in order to more clearly illustrate the feature of the embodiment, a baseband signal generating circuit 210 and a polar signal generating circuit 212 are further included in FIG. 2. The baseband signal generating circuit 210 generates an I channel baseband signal and a Q channel baseband signal according to the input signal Si. The polar signal generating circuit 212 is coupled to the baseband signal generating circuit 210 for converting the I channel baseband signal and the Q channel baseband signal into the phase component Sp and the amplitude component Sa, respectively, of the input signal Si.

The first operation circuit 202 comprises a phase detector 2022, an arithmetic circuit 2024, and a phase adjusting circuit 2026. The phase detector 2022 generates a phase difference $\Delta\theta$ between a first phase $\theta1$ corresponding to a first sample Sam1 in the input signal Si and a second phase $\theta2$ corresponding to a second sample Sam2 in the input signal Si. The arithmetic circuit 2024 is coupled to the phase detector 2022 for generating a compensative phase $\theta$ and the weighting factor Wt according to the phase difference $\Delta\theta$ and a target phase difference range (i.e., R3 in FIG. 3). The phase adjusting circuit 2026 is coupled to the arithmetic circuit 2024 for adjusting the second phase $\theta2$ according to the compensative phase $\theta$ to generate the adjusted phase component Sap such that a second phase difference (i.e., $\Delta\theta1$ in FIG. 3) between the adjusted phase component Sap and the first phase $\theta1$ falls within the target phase difference range. Please note that, in another embodiment, the phase adjusting circuit 2026 may be designed for selectively adjusting one of the first phase $\theta1$ and the second phase $\theta2$ according to the compensative phase $\theta$ to generate the adjusted phase component Sap, which is also within the scope of the present invention.

The fourth operation circuit 208 comprises a phase-locked loop circuit 2082 and a combining circuit 2084. The phase-locked loop circuit 2082 is coupled to the second operation circuit 204 for locking the frequency component Sf to generate a locked signal Slf. The combining circuit 2084 is coupled to the phase-locked loop circuit 2082 for generating the output signal So according to the locked signal Slf and the adjusted amplitude component Saa. In the first embodiment, the combining circuit 2084 is a multiplier utilized for multiplying the locked signal Slf with the adjusted amplitude component Saa to generate the output signal So. The phase adjusting circuit 2026 adds the compensative phase $\theta$ to the second phase $\theta2$ to generate the adjusted phase component Sap.

Figure 3:
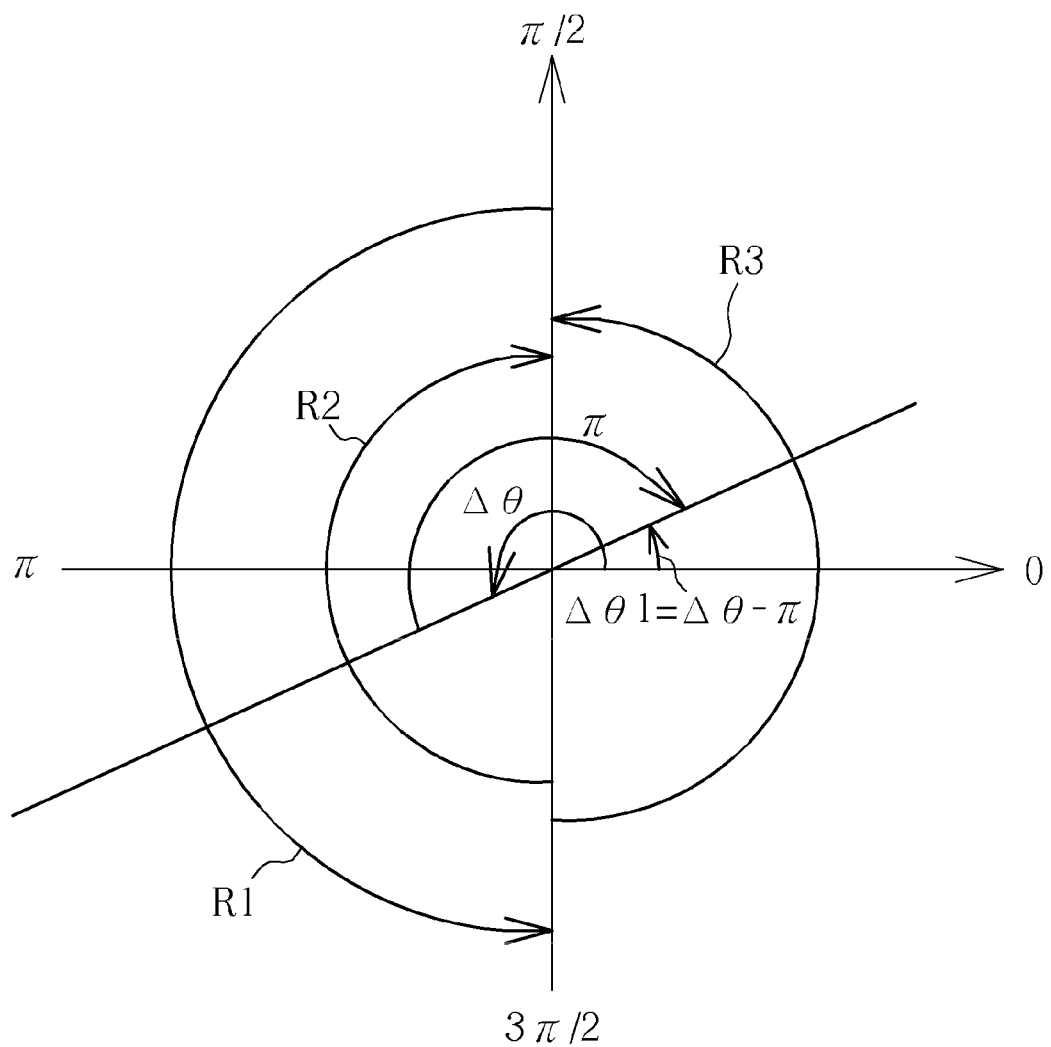
FIG. 3 is a phase diagram illustrating the transition of a phase difference transited from a first phase difference range or a second phase difference range into a third phase difference range.

In the first embodiment, the first operation circuit 202 limits the phase difference $\Delta\theta$ between the first phase $\theta1$ corresponding to the first sample Sam1 and the second phase $\theta2$ corresponding to the second sample Sam2 into the range not larger than 180°. More specifically, the first operation circuit 202 transits the phase difference $\Delta\theta$ located in a first phase difference range R1, i.e., $\pi/2<\Delta\theta\leq3\pi/2$, or a second phase difference range R2, i.e., $-3\pi/2<\Delta\theta\leq-\pi/2$, into a third phase difference range R3, i.e., $-\pi/2<\Delta\theta\leq\pi/2$, as shown in FIG. 3, wherein the first phase difference range R1 and the second phase difference range R2 occupy the same phase region. FIG. 3 is a phase diagram illustrating the transition of the phase difference $\Delta\theta$ transited from the first phase difference range R1 or the second phase difference range R2 into the third phase difference range R3. Therefore, in this embodiment, the phase diagram is divided into two phase difference ranges, i.e., R1 or R2, and R3, and the first phase difference range R1 is the range larger than $\pi/2$ and not larger than $3\pi/2$, the second phase difference range R2 is the range larger than $-3\pi/2$ and not larger than $-\pi/2$, and the third phase difference range R3 is the range larger than $-\pi/2$ and not larger than $\pi/2$. When the phase difference $\Delta\theta$ between the first phase $\theta1$ corresponding to the first sample Sam1 and the second phase $\theta2$ corresponding to the second sample Sam2 is limited into the third phase difference range R3, the phase variation of the adjusted phase component Sap is not larger than 180°. As mentioned in the related art, when the phase variation of the adjusted phase component Sap decreases, the frequency range of the frequency component Sf also decreases. In this way, the complexity of the phase-locked loop circuit 2082 and the combining circuit 2084 can be reduced. The following paragraph describes the detailed operation of the signal processing circuit 200.

Figure 4:
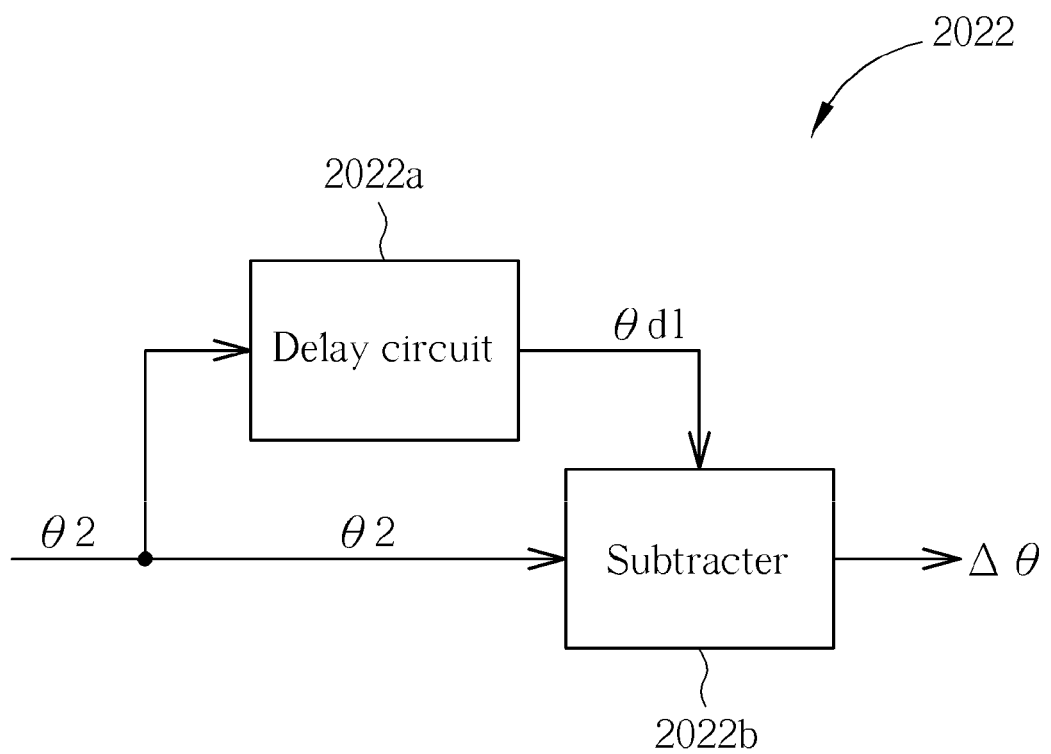
FIG. 4 is a diagram illustrating a phase detector of the signal processing circuit shown in FIG. 2.

When the first sample Sam1 and the second sample Sam2, in which the first sample Sam1 and the second sample Sam2 are two successive samples in the input signal Si, and the first sample Sam1 leads the second sample Sam2, are inputted to the first operation circuit 202, the phase detector 2022 detects the phase difference $\Delta\theta$ between the first phase $\theta1$ corresponding to the first sample Sam1 and the second phase $\theta2$ corresponding to the second sample Sam2, i.e., $\Delta\theta=\theta2-\theta1$, and determines if the phase difference $\Delta\theta$ is located in the first phase difference range R1, the second phase difference range R2, or the third phase difference range R3 as shown in FIG. 4. FIG. 4 is a diagram illustrating the phase detector 2022 of the signal processing circuit 200. The phase detector 2022 comprises a delay circuit 2022a and a subtracter 2022b. The delay circuit 2022a delays the first phase $\theta1$ to generate a delayed phase $\theta d1$. The subtracter 2022b is coupled to the delay circuit 2022a for subtracting the delayed phase $\theta d1$ from the second phase $\theta2$ to generate the phase difference $\Delta\theta$, which is equivalent to $\theta2-\theta1$.

Figure 5:
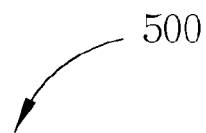
FIG. 5 is a table illustrating a look-up table of the signal processing circuit shown in FIG. 2.

The arithmetic circuit 2024 then generates a compensative phase $\theta$ and the weighting factor Wt according to the phase difference $\Delta\theta$. In this embodiment, the arithmetic circuit 2024 utilizes a look-up table 500 (but is not limited to this method) to determine the compensative phase $\theta$ and the weighting factor Wt according to the phase difference $\Delta\theta$ as shown in FIG. 5, wherein the look-up table 500 records three entries corresponding to the three phase difference ranges R1, R2, R3, respectively; each of the entries stores a specific compensative phase $-\pi$, $\pi$, or 0, and a specific weighting factor $-1$, or 1, mapped to a specific phase difference range R1, R2, or R3. FIG. 5 is a table illustrating the look-up table 500 of the signal processing circuit 200. The arithmetic circuit 2024 searches the look-up table 500 for a target entry which stores the compensative phase $\theta$ and the weighting factor Wt, where the phase difference $\Delta\theta$ falls in one of the specific phase difference ranges (i.e., R1, R2, and R3) to which the target entry corresponds.

It should be noted that, in this embodiment, the purpose of the phase adjusting circuit 2026 is to adjust the phase difference $\Delta\theta$ between the first sample Sam1 and the second sample Sam2 to locate it into the third phase difference range R3, therefore the phase adjusting circuit 2026 adds up the second phase $\theta2$ and the compensative phase $\theta$ of $-\pi$ to generate an adjusted second phase $\theta21$ when the phase difference $\Delta\theta$ is located in the first phase difference range R1, adds up the second phase $\theta2$ and the compensative phase $\theta$ of $\pi$ to generate the adjusted second phase $\theta21$ when the phase difference $\Delta\theta$ is located in the second phase difference range R2, and keeps the second phase $\theta2$ intact when the phase difference $\Delta\theta$ is located in the third phase difference range R3, i.e., adds up the second phase $\theta2$ and the compensative phase $\theta$ of 0 to generate the adjusted second phase $\theta21$ when the phase difference Δθ is located in the third phase difference range R3. Accordingly, the adjusted phase difference Δθ1, which is defined by the phase difference between the adjusted second phase θ21 and the first phase θ1, is limited into the third phase difference range R3. In other words, Δθ1=Δθ+θ, wherein θ is dependent on Δθ.

When the range of the phase difference Δθ between the first sample Sam1 and the second sample Sam2 is determined, the arithmetic circuit 2024 searches the look-up table 500 to output the weighting factor Wt according to the range of the phase difference Δθ. In this embodiment, the arithmetic circuit 2024 outputs a weighting factor Wt of −1 to the third operation circuit 206 when the phase difference Δθ is located in the first phase difference range R1, outputs a weighting factor Wt of −1 to the third operation circuit 206 when the phase difference Δθ is located in the second phase difference range R2, and outputs a weighting factor Wt of 1 to the third operation circuit 206 when the phase difference Δθ is located in the third phase difference range R3. Then, the third operation circuit 206 multiplies the amplitude component Sa corresponding to the second sample Sam2 by the weighting factor Wt to generate the adjusted amplitude component Saa.

In addition, when the frequency component Sf is up-converted by the phase-locked loop circuit 2082, the locked signal Slf representing the phase component Sp of the input signal Si is inputted to the combining circuit 2084. The combining circuit 2084 multiplies the locked signal Slf and the adjusted amplitude component Saa to generate the output signal So. The following equations illustrate the operations of the signal processing circuit 200 as shown in FIG. 2.

Suppose the amplitude component Sa corresponding to the second sample Sam2 of the input signal is A(t), the phase component Sp corresponding to the second sample Sam2 of the input signal is θ(t), and the adjusted second phase θ21 of the second sample Sam2 is θ2(t). When the phase difference Δθ is located in the first phase difference range R1, the adjusted second phase θ2(t) is θ(t)'(−π), and the output signal So generated without the second operation circuit 202 and the third operation circuit 206 is as follows:

$$A(t)\cos(\omega_c t + \theta(t)) = A(t)\cos(\omega_c t + \theta 2(t) + \pi)$$
$$= A(t)\cos(\omega_c t + \theta 2(t))\cos(\pi) - A(t)\cos(\omega_c t + \theta 2(t))\sin(\pi)$$
$$= -A(t)\cos(\omega_c t + \theta 2(t))$$

When the phase difference Δθ is located in the second phase difference range R2, the adjusted second phase θ2(t) is θ(t)'(π), and the output signal So generated without the second operation circuit 202 and the third operation circuit 206 is as follows:

$$A(t)\cos(\omega_c t + \theta(t)) = A(t)\cos(\omega_c t + \theta 2(t) - \pi)$$
$$= A(t)\cos(\omega_c t + \theta 2(t))\cos(\pi) + A(t)\sin(\omega_c t + \theta 2(t))\sin(\pi)$$
$$= -A(t)\cos(\omega_c t + \theta 2(t))$$

in which $\omega_c$ is the carrier frequency generated by the phase-locked loop circuit 2082.

It can be obtained that, when θ(t) is replaced with θ2(t), the only difference between the output signal So generated with the second operation circuit 202 and the third operation circuit 206 and without the second operation circuit 202 and the third operation circuit 206 is the sign of A(t). Therefore, when the second operation circuit 202 is included in the signal processing circuit 200 for adjusting the phase difference Δθ of the input signal Si, the third operation circuit 206 is included for adjusting the amplitude component Sa.

Please note that, those skilled in the art will understand that the phase adjusting circuit 2026 is not limited in adjusting the second phase θ2; the phase adjusting circuit 2026 may be utilized to adjust the first phase θ1 to obtain a similar effect as in the first embodiment. Therefore, the signal processing circuit 200 improves the peak frequency phenomenon generated by the second operation circuit 204 through limiting the phase difference Δθ of the input signal Si into the first phase difference range R1, thereby easing the complexity of the phase-locked loop circuit 2082 and the combining circuit 2084.

Figure 6:
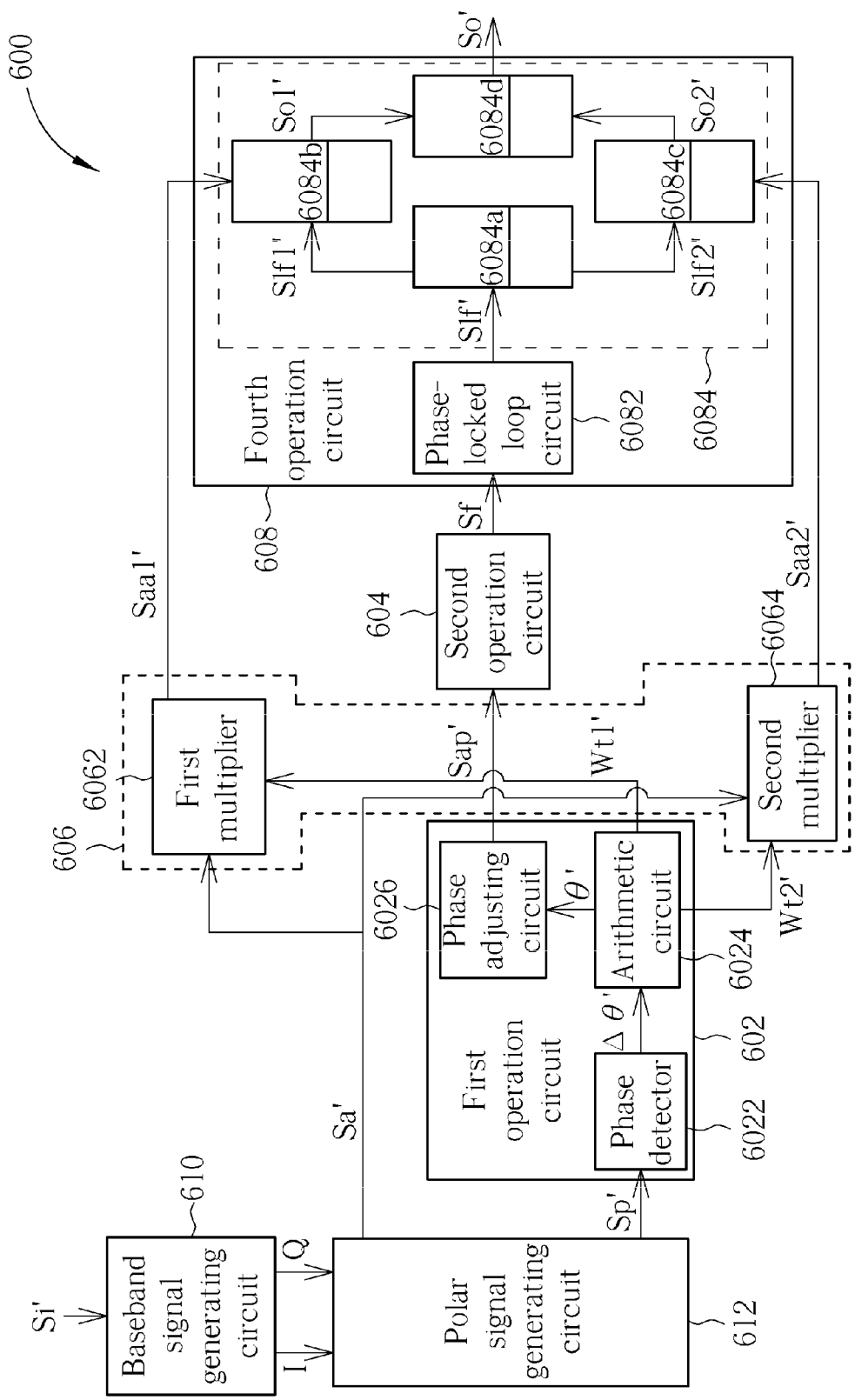
FIG. 6 is a diagram illustrating a signal processing circuit according to a second embodiment of the present invention.

FIG. 6 is a diagram illustrating a signal processing circuit 600 according to a second embodiment of the present invention. The signal processing circuit 600 comprises a first operation circuit 602, a second operation circuit 604, a third operation circuit 606, and a fourth operation circuit 608. It should be noted that the signal processing circuit 600 is disposed in a transmitter, but this is not meant to be a limitation of the present invention. The first operation circuit 602 receives a phase component Sp' of an input signal Si' and generates an adjusted phase component Sap' and two weighting factors Wt1', Wt2' according to the phase component Sp' of the input signal Si'. The second operation circuit 604 is coupled to the first operation circuit 602 for receiving the adjusted phase component Sap' and converting the adjusted phase component Sap' into a frequency component Sf' corresponding to the adjusted phase component Sap'. The third operation circuit 606 is coupled to the first operation circuit 602 for receiving an amplitude component Sa' of the input signal Si', and adjusting the amplitude component Sa' according to the two weighting factors Wt1', Wt2' to generate a first adjusted amplitude component Saa1' and a second adjusted amplitude component Saa2'. The fourth operation circuit 608 is coupled to the second operation circuit 604 and the third operation circuit 606 for generating an output signal So' according to the frequency component Sf' and the first adjusted amplitude component Saa1' and the second adjusted amplitude component Saa2'. Please note that, in order to more clearly illustrate the feature of the embodiment, a baseband signal generating circuit 610 and a polar signal generating circuit 612 are further included in FIG. 6. The baseband signal generating circuit 610 generates an I channel baseband signal and a Q channel baseband signal according to the input signal Si'. The polar signal generating circuit 612 is coupled to the baseband signal generating circuit 610 for converting the I channel baseband signal and the Q channel baseband signal into the phase component Sp' and the amplitude component Sa', respectively, of the input signal Si'.

The first operation circuit 602 comprises a phase detector 6022, an arithmetic circuit 6024, and a phase adjusting circuit 6026. The phase detector 6022 generates a phase difference Δθ' between a first phase θ1' corresponding to a first sample Sam1' in the input signal Si' and a second phase θ2' corresponding to a second sample Sam2' in the input signal Si'. The arithmetic circuit 6024 is coupled to the phase detector 6022 for generating a compensative phase θ', the first weighting factor Wt1', and the second weighting factor Wt2' according to the phase difference Δθ'. The phase adjusting circuit 6026 is coupled to the arithmetic circuit 6024 for adjusting the second phase θ2' according to the compensative phase θ' to generate the adjusted phase component Sap'. Please note that, in another embodiment, the phase adjusting circuit 6026 may be designed for selectively adjusting one of the first phase θ1' and the second phase θ2' according to the compensative phase θ' to generate the adjusted phase component Sap', which is also within the scope of the present invention.

The fourth operation circuit 608 comprises a phase-locked loop circuit 6082 and a combining circuit 6084. The phase-locked loop circuit 6082 is coupled to the second operation circuit 604 for locking the frequency component Sf' to generate a locked signal Slf'. The combining circuit 6084 is coupled to the phase-locked loop circuit 6082 for generating the output signal So' according to the locked signal Slf' and the first adjusted amplitude component Saa1' and the second adjusted amplitude component Saa2'.

The third operation circuit 606 comprises a first multiplier 6062 and a second multiplier 6064. The first multiplier 6062 is coupled to the first operation circuit 602 for multiplying the amplitude component Sa' by the first weighting factor Wt1' generated from the first operation circuit 602 to output the first adjusted amplitude component Saa1' of the adjusted amplitude component Saa'. The second multiplier 6064 is coupled to the first operation circuit 602 for multiplying the amplitude component Sa' by the second weighting factor Wt2' generated from the first operation circuit 602 to output the second adjusted amplitude component Saa2' of the adjusted amplitude component Saa', wherein the combining circuit 6084 generates the output signal So' according to the locked signal Slf', the first adjusted amplitude component Saa1' of the adjusted amplitude component Saa', and the second adjusted amplitude component Saa2' of the adjusted amplitude component Saa'.

In the second embodiment, the combining circuit 6084 comprises a phase splitter 6084a, a third multiplier 6084b, a fourth multiplier 6084c, and a subtracter 6084d. The phase splitter 6084a is coupled to the phase-locked loop circuit 6082 for splitting the locked signal Slf' into a first locked signal Slf1' and a second locked signal Slf2'. The third multiplier 6084b is coupled to the phase splitter 6084a and the first multiplier 6062 for multiplying the first locked signal Slf1' by the first adjusted amplitude component Saa1' to generate a first output component So1' of the output signal So'. The fourth multiplier 6084c is coupled to the phase splitter 6084a and the second multiplier 6064 for multiplying the second locked signal Slf2' by the second adjusted amplitude component Saa2' to generate a second output component So2' of the output signal So'. The subtracter 6084d is coupled to the third multiplier 6084b and the fourth multiplier 6084c for subtracting the second output component So2' from the first output component So1' to generate the output signal So'.

In the second embodiment, the phase adjusting circuit 6026 adds the compensative phase θ' to the second phase θ2' to generate the adjusted phase component Sap'.

Figure 7:
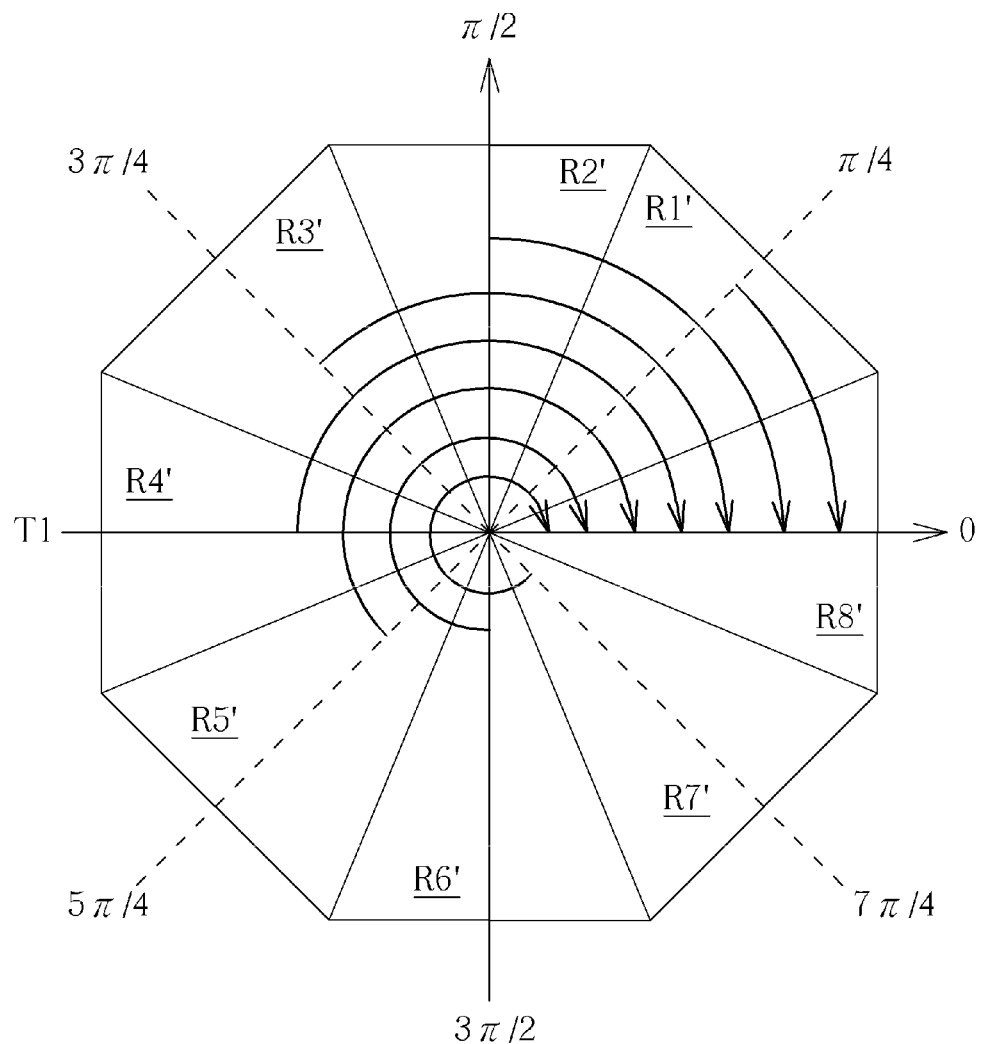
FIG. 7 is a phase diagram illustrating the eighth phase difference ranges of the signal processing circuit shown in FIG. 6.

In the second embodiment, the first operation circuit 602 limits the phase difference Δθ' between the first phase θ1' corresponding to the first sample Sam1' and the second phase θ2' corresponding to the second sample Sam2' into the range not larger than 45°. More specifically, the first operation circuit 602 transits the phase difference Δθ' located in a first phase difference range R1', i.e., $\pi/8 < \Delta\theta' \leq 3\pi/8$, a second phase difference range R2', i.e., $3\pi/8 < \Delta\theta' \leq 5\pi/8$, a third phase difference range R3', i.e., $5\pi/8 < \Delta\theta' \leq 7\pi/8$, a fourth phase difference range R4', i.e., $7\pi/8 < \Delta\theta' \leq 9\pi/8$, a fifth phase difference range R5', i.e., $9\pi/8 < \Delta\theta' \leq 11\pi/8$, a sixth phase difference range R6', i.e., $11\pi/8 < \Delta\theta' \leq 13\pi/8$, and a seventh phase difference range R7', i.e., $13\pi/8 < \Delta\theta' \leq 15\pi/8$, into an eighth phase difference range R8', i.e., $-\pi/8 < \Delta\theta' \leq \pi/8$, as shown in FIG. 7. FIG. 7 is a phase diagram illustrating the transition of the phase difference Δθ' transited from the first phase difference range R1', the second phase difference range R2', the third phase difference range R3', the fourth phase difference range R4', the fifth phase difference range R5', the sixth phase difference range R6', and the seventh phase difference range R7' into the eighth phase difference range R8'. Therefore, in this embodiment, the phase diagram is divided into eight phase difference ranges, i.e., R1'-R8', wherein the first phase difference range R1' is the range larger than $\pi/8$ and not larger than $3\pi/8$, the second phase difference range R2' is the range larger than $3\pi/8$ and not larger than $5\pi/8$, the third phase difference range R3' is the range larger than $5\pi/8$ and not larger than $7\pi/8$, the fourth phase difference range R4' is the range larger than $7\pi/8$ and not larger than $9\pi/8$, the fifth phase difference range R5' is the range larger than $9\pi/8$ and not larger than $11\pi/8$, the sixth phase difference range R6' is the range larger than $11\pi/8$ and not larger than $13\pi/8$, the seventh phase difference range R7' is the range larger than $13\pi/8$ and not larger than $15\pi/8$, and the eighth phase difference range R8' is the range larger than $-\pi/8$ and not larger than $\pi/8$.

When the phase difference Δθ' between the first phase θ1' corresponding to the first sample Sam1' and the second phase θ2' corresponding to the second sample Sam2' is limited into the eighth phase difference range R8', the phase variation of the adjusted phase component Sap' is not larger than 45°. As mentioned in the related art, when the phase variation of the adjusted phase component Sap' decreases, the frequency range of the frequency component Sf' also decreases. In this way, the complexity of the phase-locked loop circuit 6082 and the combining circuit 6084 can be reduced. The following paragraph describes the detailed operation of the signal processing circuit 600.

When the first sample Sam1' and the second sample Sam2', in which the first sample Sam1' and the second sample Sam2' are two successive samples in the input signal Si', and the first sample Sam1' leads the second sample Sam2', are inputted to the first operation circuit 602, the phase detector 6022 detects the phase difference Δθ' between the first phase θ1' corresponding to the first sample Sam1' and the second phase θ2' corresponding to the second sample Sam2', i.e., Δθ'=θ2'-θ1', and determines if the phase difference Δθ' is located in the first phase difference range R1', the second phase difference range R2', the third phase difference range R3', the fourth phase difference range R4', the fifth phase difference range R5', the sixth phase difference range R6', the seventh phase difference range R7', or the eighth phase difference range R8'. Please note that the configuration of the phase detector 2022 is as shown in FIG. 4, thus detailed description is omitted here for brevity.

Figure 8:
FIG. 8 is a table illustrating the look-up table of the signal processing circuit shown in FIG. 6.

The arithmetic circuit 6024 then generates a compensative phase θ', the first weighting factor Wt1', and the second weighting factor Wt2' according to the phase difference Δθ'. More specifically, the first weighting factor Wt1' is derived from cos θ', and the second weighting factor Wt2' is derived from sin θ'. In this embodiment, the arithmetic circuit 6024 utilizes a look-up table 800 (but is not limited to this method) to determine the compensative phase θ', the first weighting factor Wt1', and the second weighting factor Wt2' according to the phase difference Δθ' as shown in FIG. 8, wherein the look-up table 800 records eight entries corresponding to the eight phase difference ranges R1'-R8', respectively; each of the entries stores a specific compensative phase $-\pi/4$, $-\pi/2$, $-3\pi/4$, $-\pi$, $-5\pi/4$, $-3\pi/2$, $-7\pi/4$, or 0, a first specific weighting factor $$-\frac{\sqrt{2}}{2}, \frac{\sqrt{2}}{2},$$

−1, 1, or 0, and a second specific weighting factor $$-\frac{\sqrt{2}}{2}, \frac{\sqrt{2}}{2},$$

−1, 1, or 0, mapped to a specific phase difference range R1', R2', . . . , R7', or R8'. FIG. 8 is a table illustrating the look-up table 800 of the signal processing circuit 600. The arithmetic circuit 6024 searches the look-up table 800 for a target entry which stores the compensative phase θ', the first weighting factor Wt1', and the second weighting factor Wt2', where the phase difference Δθ' falls in one of the specific phase difference ranges (i.e., R1', R2', . . . , R7', and R8') to which the target entry corresponds.

It should be noted that, in this embodiment, the purpose of the phase adjusting circuit 6026 is to adjust the phase difference Δθ' between the first sample Sam1' and the second sample Sam2' to locate into the eighth phase difference range R8', therefore the phase adjusting circuit 8026 adds up the second phase θ2' and the compensative phase θ' of −π/4 to generate an adjusted second phase θ21' when the phase difference Δθ' is located in the first phase difference range R1', adds up the second phase θ2' and the compensative phase θ' of −π/2 to generate the adjusted second phase θ21' when the phase difference Δθ' is located in the second phase difference range R2', adds up the second phase θ2' and the compensative phase θ' of −3π/4 to generate the adjusted second phase θ21' when the phase difference Δθ' is located in the third phase difference range R3', adds up the second phase θ2' and the compensative phase θ' of −π to generate the adjusted second phase θ21' when the phase difference Δθ' is located in the fourth phase difference range R4', adds up the second phase θ2' and the compensative phase θ' of −5π/4 to generate the adjusted second phase θ21' when the phase difference Δθ' is located in the fifth phase difference range R5', adds up the second phase θ2' and the compensative phase θ' of −3π/2 to generate the adjusted second phase θ21' when the phase difference Δθ' is located in the sixth phase difference range R4', adds up the second phase θ2' and the compensative phase θ' of −7π/4 to generate the adjusted second phase θ21' when the phase difference Δθ' is located in the seventh phase difference range R7', and keeps the second phase θ2' intact when the phase difference Δθ' is located in the eighth phase difference range R8', i.e., adds up the second phase θ2' and the compensative phase θ' of 0 to generate the adjusted second phase θ21' when the phase difference Δθ' is located in the eighth phase difference range R8'. Accordingly, the adjusted phase difference Δθ2', which is defined by the phase difference between the adjusted second phase θ21' and the first phase θ1', is limited to the eighth phase difference range R8'. In other words, Δθ2'=Δθ'+θ', wherein θ' is depended on Δθ'.

When the range of the phase difference Δθ' between the first sample Sam1' and the second sample Sam2' is determined, the arithmetic circuit 6024 searches the look-up table 800 to output the first weighting factor Wt1' and the second weighting factor Wt2' according to the range of the phase difference Δθ'. In this embodiment, the arithmetic circuit 6024 outputs the first weighting factor Wt1' of $$\frac{\sqrt{2}}{2}$$

and the second weighting factor Wt2' of $$\frac{\sqrt{2}}{2}$$

to the first multiplier 6062 and the second multiplier 6064 respectively when the phase difference Δθ' is located in the first phase difference range R1', outputs the first weighting factor Wt1' of 0 and the second weighting factor Wt2' of 1 to the first multiplier 6062 and the second multiplier 6064 respectively when the phase difference Δθ' is located in the second phase difference range R2', outputs the first weighting factor Wt1' of $$-\frac{\sqrt{2}}{2}$$

and the second weighting factor Wt2' of $$\frac{\sqrt{2}}{2}$$

to the first multiplier 6062 and the second multiplier 6064 respectively when the phase difference Δθ' is located in the third phase difference range R3', outputs the first weighting factor Wt1' of −1 and the second weighting factor Wt2' of 0 to the first multiplier 6062 and the second multiplier 6064 respectively when the phase difference Δθ' is located in the fourth phase difference range R4', outputs the first weighting factor Wt1' of $$-\frac{\sqrt{2}}{2}$$

and the second weighting factor Wt2' of $$-\frac{\sqrt{2}}{2}$$

to the first multiplier 6062 and the second multiplier 6064 respectively when the phase difference Δθ' is located in the fifth phase difference range R5', outputs the first weighting factor Wt1' of 0 and the second weighting factor Wt2' of −1 to the first multiplier 6062 and the second multiplier 6064 respectively when the phase difference Δθ' is located in the sixth phase difference range R6', outputs the first weighting factor Wt1' of $$\frac{\sqrt{2}}{2}$$

and the second weighting factor Wt2' of $$-\frac{\sqrt{2}}{2}$$

to the first multiplier 6062 and the second multiplier 6064 respectively when the phase difference Δθ' is located in the seventh phase difference range R7', and outputs the first weighting factor Wt1' of 1 and the second weighting factor Wt2' of 0 to the first multiplier 6062 and the second multiplier 6064 respectively when the phase difference Δθ' is located in the eighth phase difference range R8'. Then, the first multiplier 6062 multiplies the amplitude component Sa' corresponding to the second sample Sam2' by the first weighting factor Wt1' to generate the first adjusted amplitude component Saa1', and the second multiplier 6064 multiplies the amplitude component Sa' corresponding to the second sample Sam2' by the second weighting factor Wt2' to generate the second adjusted amplitude component Saa2'.

In addition, when the frequency component Sf' is up-converted by the phase-locked loop circuit 6082, the locked signal Slf' representing the phase component Sp' of the input signal Si' is inputted to the combining circuit 6084. The phase splitter 6084a splits the locked signal Slf' into a first locked signal Slf1' and a second locked signal Slf2', wherein the first locked signal Slf1' and the second locked signal Slf2' are substantially 90 degrees out of phase. More specifically, the first locked signal Slf1' corresponds to the cosine signal of the locked signal Slf', and the second locked signal Slf2' corresponds to the sine signal of the locked signal Slf'. Then, the third multiplier 6084b multiplies the first locked signal Slf1' by the first adjusted amplitude component Saa1' to generate the first output component So1' of the output signal So'. The fourth multiplier 6084c multiplies the second locked signal Slf2' by the second adjusted amplitude component Saa2' to generate the second output component So2' of the output signal So'. Then, the subtracter 6084d subtracts the second output component So2' from the first output component So1' to generate the output signal So'. The equations in the following paragraphs illustrate the operations of the signal processing circuit 600 as shown in FIG. 6.

Suppose the amplitude component Sa' corresponding to the second sample Sam2' of the input signal is A(t)', the phase component Sp' corresponding to the second sample Sam2' of the input signal is θ(t)', the adjusted second phase θ21' of the second sample Sam2 is θ2(t)'. For example, when the phase difference Δθ' is located in a specific phase difference range, the adjusted second phase θ2(t)' is θ(t)'+(−θ'), wherein (−θ') is the compensative phase, and the output signal So' generated without the second operation circuit 602 and the third operation circuit 606 is as follows:

$$A(t)'\cos(\omega_c t + \theta(t)') = A(t)'\cos(\omega_c t + \theta 2(t)' + \theta')$$
$$= A(t)'\cos(\theta')\cos(\omega_c t + \theta 2(t)') -$$
$$A(t)'\sin(\theta')\sin(\omega_c t + \theta 2(t)')$$

In which $\omega_c$ is the carrier frequency generated by the phase-locked loop circuit 6082.

Therefore, it can be obtained that when θ(t)' of the term A(t)' cos($\omega_c$t+θ(t)') is replaced with θ2(t)', i.e. when the output signal So' is generated with the second operation circuit 602 and the third operation circuit 606, the output signal So' should be rewritten as A(t)' cos(θ')cos($\omega_c$t+θ2(t)')−A(t)' sin(θ')sin($\omega_c$t+θ2(t)') to keep consistency with the term A(t)' cos($\omega_c$t+θ(t)') generated without the second operation circuit 602 and the third operation circuit 606. In other words, the first weighting factor Wt1' corresponds to the term cos(θ'), and the second weighting factor Wt2' corresponds to the term sin(θ'). The first multiplier 6062 is utilized to generate the term A(t)' cos(θ') in the term A(t)' cos(θ')cos($\omega_c$t+θ2(t)')−A(t)' sin(θ')sin($\omega_c$t+θ2(t)') and the second multiplier 6064 is utilized to generate the term A(t)' sin(θ') in the term A(t)' cos(θ')cos($\omega_c$t+θ2(t)')−A(t)' sin(θ')sin($\omega_c$t+θ2(t)'). Furthermore, the first locked signal Slf1' corresponds to the term cos($\omega_c$t+θ2(t)'), and the second locked signal Slf2' corresponds to the term sin($\omega_c$t+θ2(t)'). The first output component So1' corresponds to the term A(t)' cos(θ')cos($\omega_c$t+θ2(t)'), and the second output component So2' corresponds to the term A(t)' sin(θ')sin($\omega_c$t+θ2(t)'). The subtracter 6084d subtracts the term A(t)' sin(θ')sin($\omega_c$t+θ2(t)') from the term A(t)' cos(θ')cos($\omega_c$t+θ2(t)') to generate the term A(t)' cos(θ')cos($\omega_c$t+θ2(t)')−A(t)' sin(θ')sin($\omega_c$t+θ2(t)').

Please note that, those skilled in the art will understand that the phase adjusting circuit 6026 is not limited to adjusting the second phase θ2'; the phase adjusting circuit 6026 may also be utilized to adjust the first phase θ1' to obtain a similar effect as in the second embodiment. Therefore, the signal processing circuit 600 improves the peak frequency phenomenon generated by the second operation circuit 604 through limiting the phase difference Δθ' of the input signal Si' into the eighth phase difference range R8', thereby easing the complexity of the phase-locked loop circuit 6082 and the combining circuit 6084.

Furthermore, although the above-mentioned first embodiment and second embodiment limit the phase difference of the input signal into 180° and 45° respectively, this is not meant to be the limitation of the present invention. Persons skilled in the art are able to modify the above-mentioned embodiment to limit the phase difference of the input signal into any range of phases, which also belongs to the scope of the present invention.

Figure 9:
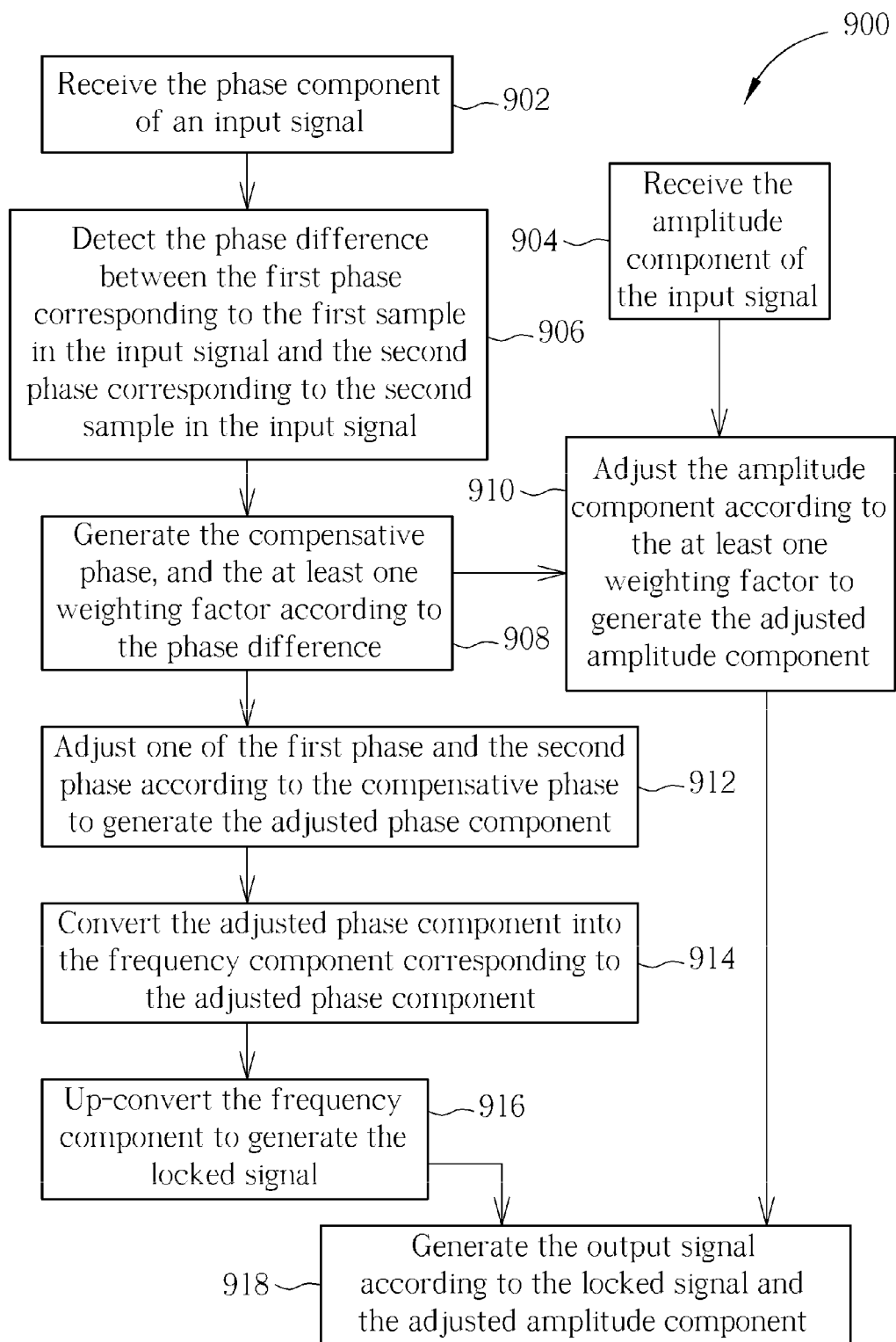
FIG. 9 is a diagram illustrating a signal processing method according to a third embodiment of the present invention.

FIG. 9 is a diagram illustrating a signal processing method 900 according to a third embodiment of the present invention. The signal processing method 900 is applicable in the above-mentioned signal processing circuits 200, 600. Provided that substantially the same result is achieved, the steps of the flowchart shown in FIG. 9 need not be in the exact order shown and need not be contiguous, that is, other steps can be intermediate. The signal processing circuit method 900 comprises the following steps:

Step 902: Receive the phase component of an input signal, go to step 906;

Step 904: Receive the amplitude component of the input signal, go to step 910';

Step 906: Detect the phase difference between the first phase corresponding to the first sample in the input signal and the second phase corresponding to the second sample in the input signal;

Step 908: Generate the compensative phase, and the at least one weighting factor according to the phase difference, go to steps 910 and 912;

Step 910: Adjust the amplitude component according to the at least one weighting factor to generate the adjusted amplitude component, go to step 918;

Step 912: Adjust the second phase according to the compensative phase to generate the adjusted phase component;

Step 914: Convert the adjusted phase component into the frequency component corresponding to the adjusted phase component;

Step 916: Up-convert the frequency component to generate the locked signal;

Step 918: Generate the output signal according to the locked signal and the adjusted amplitude component.

Please note that, to more clearly illustrate the signal processing method 900, the signal processing method 900 is described in conjunction with the operating circuit 600 herein. When the phase component Sp' is received in step 902, the phase difference $\Delta\theta'$ between the first phase $\theta 1'$ corresponding to the first sample Sam1' in the input signal Si' and the second phase $\theta 2'$ corresponding to the second sample Sam2' in the input signal Si' is generated to determine which phase difference range of the phase difference $\Delta\theta'$ is located in. In this embodiment, each phase difference range corresponds to one of the compensative phase $\theta'$ and two weighting factors Wt1', Wt2' as shown in FIG. 8. Then, in step 910, two adjusted amplitude components Saa1', Saa2' are generated according to the two weighting factors Wt1', Wt2' respectively, while in step 912, the adjusted phase component Sap' is generated according to the compensative phase $\theta'$. As mentioned in the above embodiments, the phase variation of the adjusted phase component Sap' is limited into a specific phase range, such as 45°.

In step 914, the adjusted phase component Sap' is converted into the frequency component Sf'. After the frequency component Sf' is up-converted to a specific carrier frequency, such as the above-mentioned $\omega_c$, the output signal So' can be generated by combining the locked signal Slf' and the two adjusted amplitude components Saa1', Saa2' in step 918.

More specifically, in this embodiment, the locked signal Slf' is first split into two signals in step 918, which are the first locked signal Slf1' and the second locked signal Slf2', wherein the first locked signal Slf1' is substantially 90° out of phase with the second locked signal Slf2'. Then, the first output component So1' is generated by multiplying the first locked signal Slf1' with the first adjusted amplitude component Saa1', and the second output component So2' is generated by multiplying the second locked signal Slf2' with the second adjusted amplitude component Saa2'. Finally, the output signal So' is generated by combining the first output component So1' and the second output component So2'.

Briefly, through limiting the phase variation of the phase component into a specific phase range before being inputted to the second operation circuit (204, 604), the peak frequency phenomenon generated by the second operation circuit is improved, and the complexity of the following phase-locked loop circuit and the combining circuit can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing circuit, comprising:
a phase modulating path, arranged to adjust a phase component of an input signal to generate an adjusted phase component such that a phase difference of the input signal falls within a target phase difference range; and
an amplitude modulating path, arranged to change a sign of an amplitude component of the input signal corresponding to the phase component to generate an adjusted amplitude component when the phase modulating path adjusts the phase component.

2. The signal processing circuit of claim 1, further comprising:
an operation circuit, coupled to the phase modulating path and the amplitude modulating path, for generating an output signal according to the adjusted phase component and the adjusted amplitude component.

3. The signal processing circuit of claim 1, wherein the target phase difference range is $\pi$.

4. The signal processing circuit of claim 1, wherein the amplitude modulating path is arranged to multiply the amplitude component by −1 to generate the adjusted amplitude component when the phase modulating path adjusts the phase component.

5. The signal processing circuit of claim 1, wherein the phase modulating path comprises:
a phase detector, for detecting a first phase difference between a first phase corresponding to a first sample in the input signal and a second phase corresponding to a second sample in the input signal;
an arithmetic circuit, coupled to the phase detector, for generating a compensative phase according to the first phase difference; and
a phase adjusting circuit, coupled to the arithmetic circuit, for adjusting the second phase according to the compensative phase to generate the adjusted phase component such that the phase difference between the adjusted phase component and the first phase falls within the target phase difference range.

6. The signal processing circuit of claim 5, wherein the phase adjusting circuit is arranged to add up the second phase and the compensative phase to generate the adjusted phase component.

7. The signal processing circuit of claim 5, wherein when the phase detector detects that the first phase difference is larger than $$\frac{\pi}{2}$$

but not larger than $$\frac{3\pi}{2},$$

the arithmetic circuit generates the compensative phase of $-\pi$, and when the phase detector detects that the first phase difference is larger than $$-\frac{3\pi}{2}$$

but not larger than $$\frac{-\pi}{2},$$

the arithmetic circuit generates the compensative phase of $\pi$.

8. A signal processing circuit, comprising:
- a phase modulating path, arranged to adjust a phase component of an input signal to generate an adjusted phase component such that a phase difference of the input signal falls within a target phase difference range; and
- an amplitude modulating path, arranged to adjust an amplitude component of the input signal corresponding to the phase component to generate an adjusted amplitude component according to at least one weighting factor when the phase modulating path adjusts the phase component.

9. The signal processing circuit of claim 8, further comprising:
- an operation circuit, coupled to the phase modulating path and the amplitude modulating path, for generating an output signal according to the adjusted phase component and the adjusted amplitude component.

10. The signal processing circuit of claim 8, wherein the target phase difference range is $$\frac{\pi}{4}.$$

11. The signal processing circuit of claim 8, wherein the phase modulating path further generates the weighting factor when the adjusted phase component is generated.

12. The signal processing circuit of claim 8, wherein the phase modulating path comprises:
- a phase detector, for detecting a first phase difference between a first phase corresponding to a first sample in the input signal and a second phase corresponding to a second sample in the input signal;
- an arithmetic circuit, coupled to the phase detector, for generating a compensative phase according to the first phase difference; and
- a phase adjusting circuit, coupled to the arithmetic circuit, for adjusting the second phase according to the compensative phase to generate the adjusted phase component such that the phase difference between the adjusted phase component and the first phase falls within the target phase difference range.

13. The signal processing circuit of claim 12, wherein the phase adjusting circuit adds the compensative phase to the second phase to generate the adjusted phase component.

14. The signal processing circuit of claim 12, wherein the weighting factor comprises a first weighting factor set by cos θ, and a second weighting factor set by sin θ, where θ is the compensative phase.

15. The signal processing circuit of claim 12, wherein the arithmetic circuit is further arranged to generate the weighting factor according to the first phase difference.

16. The signal processing circuit of claim 15, wherein a look-up table records a plurality of entries corresponding to a plurality of different phase difference ranges, respectively; each of the entries stores a specific compensative phase and at least one specific weighting factor mapped to a specific phase difference range; and the arithmetic circuit searches the look-up table for a target entry which stores the compensative phase and the weighting factor, where the first phase difference falls in one of the specific phase difference ranges from that which the target entry corresponds to.

17. The signal processing circuit of claim 15, wherein the amplitude modulating path comprises:
- a first multiplier, coupled to the arithmetic, for multiplying the amplitude component by a first weighting factor generated from the arithmetic circuit to output a first adjusted amplitude component of the adjusted amplitude component; and
- a second multiplier, coupled to the arithmetic, for multiplying the amplitude component by a second weighting factor generated from the arithmetic to output a second adjusted amplitude component of the adjusted amplitude component.

\* \* \* \* \*